US012623390B2

(12) United States Patent
    Wendling et al.

(10) Patent No.: US 12,623,390 B2
(45) Date of Patent: May 12, 2026

(54) METHOD OF PREPARATION OF A DECORATED WALL OR FLOOR PANELS

(71) Applicant: Akzenta Paneele + Profile GMBH, Kaisersesch (DE)

(72) Inventors: Peter Wendling, Mörsdorf (DE); Hans-Juergen Hannig, Bergisch Gladbach (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 84 days.

(21) Appl. No.: 18/086,134

(22) Filed: Dec. 21, 2022

(65) Prior Publication Data
    US 2023/0241827 A1     Aug. 3, 2023

(30) Foreign Application Priority Data

Dec. 23, 2021    (EP) ..................................... 21217444

(51) Int. Cl.
    B29C 65/00         (2006.01)
    B29C 48/00         (2019.01)
                (Continued)

(52) U.S. Cl.
    CPC ........ B29C 48/0011 (2019.02); B29C 48/002 (2019.02); B29C 48/0021 (2019.02);
                (Continued)

(58) Field of Classification Search
    CPC ....... B29C 65/02; B29C 65/40; B29C 65/405; B29C 65/70
    See application file for complete search history.

(56) References Cited

U.S. PATENT DOCUMENTS

2003/0170479 A1    9/2003  Peiffer et al.
2008/0010924 A1    1/2008  Pietruczynik et al.
                (Continued)

FOREIGN PATENT DOCUMENTS

EP        0336024 A1    10/1989
EP        3312362 A2    4/2018
                (Continued)

OTHER PUBLICATIONS

English translation of Written Opinion of the ISA issued in PCT/EP2022/087763, mailed Jun. 20, 2024; ISA/EP.
                (Continued)

*Primary Examiner* — Philip C Tucker
*Assistant Examiner* — Nickolas R Harm
(74) *Attorney, Agent, or Firm* — Harness, Dickey & Pierce, P.L.C.

(57)          ABSTRACT

The present disclosure relates to a method for producing a decorated wall or floor panel, comprising the method steps:
  a) providing a first molten polymer mass and a second molten polymer mass;
  b) extruding the molten polymer masses, wherein in particular each polymer mass is extruded by a separate extruder, wherein the molten polymer masses are layered on top of each other;
  c) expelling the layered molten polymer masses through a die;
  d) calibrating the layered molten polymer masses in order to form a plate-shaped carrier comprising at least one carrier layer comprising the first polymer mass and a sealable layer contacting the carrier layer and comprising the second polymer mass. Furthermore, the disclosure relates to plate-shaped carriers and decorative panels produced in this way, and to a device for carrying out the method.

10 Claims, 4 Drawing Sheets

Figure 1:
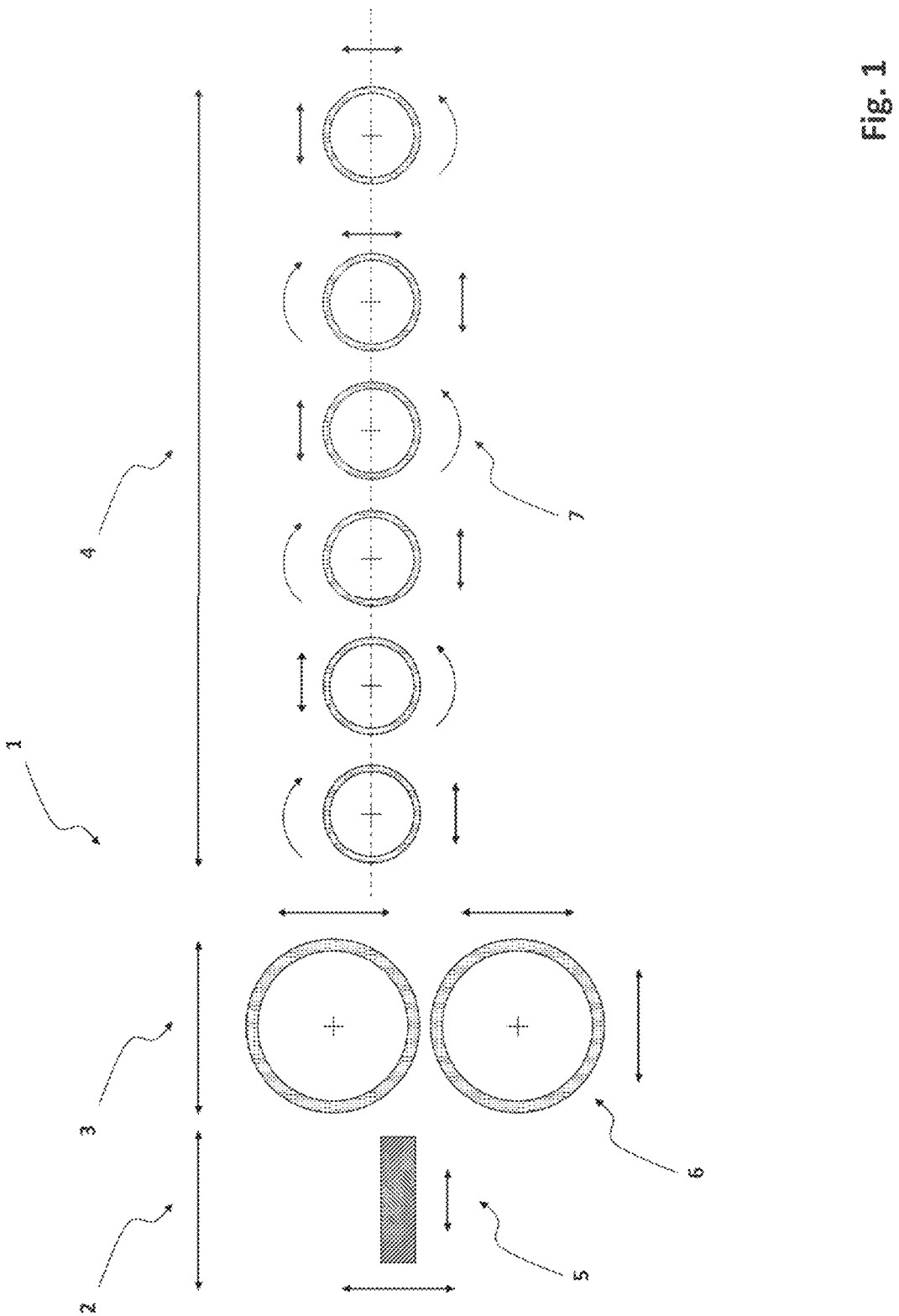

(51) Int. Cl.

| | |
|---|---|
| *B29C 48/07* | (2019.01) |
| *B29C 48/21* | (2019.01) |
| *B32B 3/30* | (2006.01) |
| *B32B 7/02* | (2019.01) |
| *B32B 7/12* | (2006.01) |
| *B32B 27/08* | (2006.01) |
| *B32B 27/18* | (2006.01) |
| *B32B 27/30* | (2006.01) |
| *B32B 27/32* | (2006.01) |
| *B29C 65/02* | (2006.01) |
| *B29C 65/40* | (2006.01) |
| *B29C 65/70* | (2006.01) |
| *B29K 23/00* | (2006.01) |
| *B29K 105/00* | (2006.01) |
| *B29K 509/00* | (2006.01) |

(52) U.S. Cl.

CPC .............. *B29C 48/07* (2019.02); *B29C 48/21* (2019.02); *B32B 3/30* (2013.01); *B32B 7/02* (2013.01); *B32B 7/12* (2013.01); *B32B 27/08* (2013.01); *B32B 27/18* (2013.01); *B32B 27/30* (2013.01); *B32B 27/32* (2013.01); *B29C 65/02* (2013.01); *B29C 65/40* (2013.01); *B29C 65/405* (2013.01); *B29C 65/70* (2013.01); *B29K 2023/14* (2013.01); *B29K 2105/0085* (2013.01); *B29K 2509/00* (2013.01); *B32B 2250/24* (2013.01); *B32B 2264/1021* (2020.08); *B32B 2264/1027* (2020.08); *B32B 2270/00* (2013.01); *B32B 2272/00* (2013.01); *B32B 2307/558* (2013.01); *B32B 2307/7265* (2013.01); *B32B 2307/7376* (2023.05); *B32B 2451/00* (2013.01); *B32B 2607/00* (2013.01)

(56) References Cited

U.S. PATENT DOCUMENTS

| | | | | |
|---|---|---|---|---|
| 2009/0026653 A1* | 1/2009 | Kossl | .................... | B29C 48/908 |
| | | | | 425/186 |
| 2009/0226698 A1* | 9/2009 | De Maria | .......... | B29C 66/1142 |
| | | | | 264/210.1 |
| 2010/0075078 A1* | 3/2010 | Quitter | ..................... | B32B 5/04 |
| | | | | 29/241 |
| 2014/0106166 A1* | 4/2014 | Nelson | ..................... | D01F 8/04 |
| | | | | 428/374 |
| 2014/0335213 A1* | 11/2014 | Zimmermann | ......... | B29C 48/92 |
| | | | | 425/141 |
| 2017/0157977 A1* | 6/2017 | Hannig | .................. | B29C 43/48 |
| 2019/0016024 A1 | 1/2019 | Zhou | | |
| 2020/0290323 A1 | 9/2020 | Hannig et al. | | |

FOREIGN PATENT DOCUMENTS

| | | |
|---|---|---|
| EP | 3835027 A1 | 6/2021 |
| KR | 1020200120945 A | 10/2020 |

OTHER PUBLICATIONS

European First Office Action issued in 202211663546.6, mailed date Nov. 12, 2025.
Korean Notice of Grounds for Rejection issued in App. No. 10-2024-7015935, issuance date Feb. 3, 2026.

* cited by examiner

METHOD OF PREPARATION OF A DECORATED WALL OR FLOOR PANELS

CROSS-REFERENCE TO RELATED APPLICATION

This application claims the benefit of and priority of European Patent Application No. 212174445, filed on Dec. 23, 2021. The entire disclosure of the above application is incorporated herein by reference.

FIELD

The present disclosure relates to a method for producing a decorated wall or floor panel, comprising the method steps:
   a) providing a first molten polymer mass and a second molten polymer mass;
   b) extruding the molten polymer masses, wherein in particular each polymer mass is extruded by a separate extruder, wherein the molten polymer masses are layered on top of each other,
   c) expelling the layered molten polymer masses through a die;
   d) calibrating the layered molten polymer masses to form a plate-shaped carrier comprising at least one carrier layer comprising the first polymer mass and a sealable layer contacting the carrier layer and comprising the second polymer mass.

Further, subject matter of the present disclosure is an apparatus for producing a decorated wall or floor panel and a wall or floor panel produced in accordance with the method described above, a panel-shaped carrier for a decorated wall or floor panel produced in accordance with the method described above, and a decorated panel produced in accordance with the method described above.

BACKGROUND

Decorated panels are known per se and these are used, for example, in interior design as floor or wall covering. In this context, the term wall panel also refers to panels which are suitable for ceiling cladding. The panels usually consist of a carrier or core made of a solid material, for example a wood-based material, which is provided on at least one side with a decorative layer and a top layer and optionally with further layers, for example a wear layer arranged between the decorative layer and the top layer. The decorative layer is usually a printed paper impregnated with a resin. The top layer and the other layers are also usually made of resin.

Methods for producing panels usually include several method steps. For example, a "cake" of granular pellets may be applied to the lower belt of a press via a spreading machine. In the course of production, this cake is usually fed into a hot belt press with steel and/or Teflon belts, in which the heating and melting of the granulate pellets takes place. Simultaneously with the melting, the material can be pressed and formed into the shape of a carrier. Subsequently, controlled cooling leads to a solidification or crystallization of the carrier material, wherein the waste heat remains largely unused because the usable temperature difference due to controlled cooling is too small for any other use. In this belt pressing process, heat is transferred from above and below by contact with the press. Another disadvantage for cooling is that the heat must pass through the glass-fiber-reinforced Teflon belt. Only then the heat transfer takes place through heat conduction into the granulate bed or the carrier material. These physical processes are very slow because the pellet cake initially still contains air from the granulate bed, which, from the point of view of product physics, may only be pressed out of the carrier slowly. To achieve acceptable belt speeds in production, a high temperature gradient must be applied for cooling, which leads to considerable waste heat losses.

In general, methods for producing decorated wall or floor panels often include further elaborate method steps in which decorations, top layers and/or wear layers are applied. In order to apply these, the components often have to be elaborately tempered and many method steps are often necessary to bond the desired layers together.

It is therefore an object of the present disclosure to provide an improved method for producing decorated wall or floor panels.

The disclosure thus proposes a method for producing a decorated wall or floor panel, comprising the method steps:
   a) providing a first molten polymer mass and a second molten polymer mass;
   b) extruding the molten polymer masses, wherein in particular each polymer mass is extruded by a separate extruder, wherein the molten polymer masses are layered on top of each other;
   c) expelling the layered molten polymer masses through a die;
   d) calibrating the layered molten polymer masses to form a plate-like carrier comprising at least a carrier layer comprising the first polymer mass and a sealable layer contacting the carrier layer and comprising the second polymer mass.

Surprisingly, it was found that the above-described method enables an improved production of a wall or floor panel. By aggregating the method steps, high-quality panels with improved decorative properties can be obtained within very short process times. By use in particular of the calibration step according to the disclosure, the panels have particularly even carrier surfaces to which high-quality decorations can be applied particularly efficiently. Without being bound by theory, decorations applied according to the disclosure exhibit particularly high-quality optical properties due to the particular smooth and defect-free surface of the carrier material. The above-mentioned process also enables a high throughput with high web speeds and reduces the proportion of non-conforming panels.

Furthermore, a greater proportion of the process energy can be recovered via the calibration sub-step according to the disclosure, which contributes overall to a smaller $CO_2$ footprint of the method used and thus also of the panel produced.

By use of the method described above it can also advantageously be achieved that the plate-shaped carrier simultaneously exhibits good dimensional stability and is particularly easy to process further. In particular, by means of the sealable layer formed it can be achieved that further layers can be applied onto the plate-shaped carrier particularly easily and precisely. By forming the sealable layer together with the carrier layer into the plate-shaped carrier, it can be achieved that the sealable layer is particularly well bonded to the carrier layer and, moreover, the sealable layer also experiences the advantages of the calibration step.

The method according to the disclosure is a method for producing a decorated wall or floor panel. In the sense of the disclosure, the term "decorated wall or floor panel" or "decorative panel" means, in particular, wall, ceiling or floor panels which have a decoration applied onto a carrier plate and simulating a decorative template. Decorative panels are used in a variety of ways both in the field of interior design of rooms and for decorative cladding of buildings, for example in exhibition stand construction. One of the most common fields of application of decorative panels is their use as a floor covering. In many cases, the decorative panels have a decoration that is intended to imitate a natural material.

Examples of such imitated natural materials or decorative templates are wood species such as maple, oak, birch, cherry, ash, walnut, chestnut, wenge or exotic woods such as panga-panga, mahogany, bamboo and bubinga. In addition, natural materials such as stones or ceramics can be imitated.

Accordingly, a "decorative template" in the sense of the present disclosure can be understood in particular to mean that such a natural material or at least its surface is to be imitated or simulated by the decoration.

The method step a) comprises providing a first molten polymer mass and a second molten polymer mass. The molten polymer masses each indicate, at least in part, the properties of a flowable viscous liquid and may be obtained, for example, by a thermal treatment step of polymers normally present as granules. The molten polymer mass can respectively consist of only one homogeneous polymer mass or of several polymer masses which are mixed with each other or are layered on top of one another in a defined form (feed block). "Granules" or a "granular material" can be understood to mean a solid or an aggregate material of a solid comprising or consisting of a plurality of solid particles, such as grains or spheres. By way of example, but not exhaustively, granular or powdery materials may be mentioned here, or suitable recycled materials present as ground materials.

Preferably, it may be provided that the first polymer mass comprises a first solid material, wherein the first solid material preferably comprises a solid material selected from the group consisting of a layered silicate powder, a chalk powder and mixtures thereof, wherein the first solid material particularly preferably comprises talc. In this way, it can be achieved that the carrier layer has particularly good mechanical properties and, at the same time, a good compatibility with the sealable layer.

In this context, layered silicate powder is understood to mean, in a manner known per se, a powder of a layered silicate. A layered silicate is a known term for minerals from the group of silicates whose silicate anions are usually arranged in layers. For example, layered silicates are understood to be minerals from the mica group, the chlorite group, the kaolinite group and the serpentine group.

Thus, the first solid material is advantageously formed at least by a major part from the mineral substance layered silicate, wherein this substance can be used, for example, in powder form or can be present in the melted polymer mass in the form of particles. In principle, the first solid material can consist of a powdery solid.

Layered silicates offer the advantage that they can allow the production of a carrier with good mechanical properties and at the same time can be easily processed into corresponding powders due to their layered structure.

In one embodiment of the disclosure, the layered silicate powder may comprise talc. In a manner known per se, talc is understood to mean a magnesium silicate hydrate which may, for example, have the chemical molecular formula $Mg_3[Si_4O_{10}(OH)_2]$. In a further preferred embodiment, the layered silicate powder may comprise at least 80 wt.-%, particularly preferably at least 95 wt.-%, of talc.

Talc in particular offers the advantage that this enables the carrier to be produced particularly gently, since it can be embedded without difficulty in the molten polymer material and thus does not exert an abrasive effect on equipment used.

In this context, chalk powder is understood to mean, in a manner known per se, a powder of a chalk. in the sense of the present disclosure, chalk is understood to mean a limestone. In particular, chalk may consist essentially of calcite.

In particular, chalk offers the advantage that, in addition to the advantageous mechanical properties, it can also impart a light to white base color to the carrier, whereby the color design of the plate-shaped carrier can be particularly simple.

Preferably, it may be provided that the first polymer mass comprises the first solid material in a range of greater than or equal to 50 wt.-% to less than or equal to 70 wt.-%, preferably greater than or equal to 55 wt.-% to less than or equal to 65 wt.-%, for example 60 wt.-%, based on the total weight of the first polymer mass. Surprisingly, it could be shown that particularly good mechanical properties can be achieved as a result.

Preferably, it may be provided that the first polymer mass comprises a first vinyl polymer, wherein the first vinyl polymer is preferably a recycled vinyl polymer, more preferably a polypropylene, most preferably a recycled polypropylene. In this way, it can be achieved that the carrier layer has good elastic properties and can be easily recycled.

Preferably, it may be provided that the first polymer mass comprises the first vinyl polymer in a range of greater than or equal to 50 wt.-% to less than or equal to 10 wt.-%, preferably greater than or equal to 20 wt.-% to less than or equal to 40 wt.-%, particularly preferably greater than or equal to 20 wt.-% to less than or equal to 30 wt.-%, based on the total weight of the first polymer mass.

According to the disclosure it may be provided that the first polymer mass has a weight ratio of the first solid material to the first vinyl polymer in a range of greater than or equal to 2:1 to less than or equal to 4:1, preferably less than or equal to 3:1.

In particular, the aforementioned first polymeric composition offers the advantage of enabling a panel with good moisture resistance. In particular, by use of such a polymer mass for forming the carrier layer, it is possible to significantly reduce or even completely prevent a panel made therefrom from swelling when exposed to moisture. Furthermore, heat-induced expansion can also be prevented or at least significantly reduced. As a result, it is possible that laying or mounting panels made with the first polymer mass is significantly simplified and/or that problems after laying or mounting the panels are significantly reduced.

At the same time, the first polymer mass offers the advantage that panels produced therewith have a very good stability, so that the risk of damages to the panel during transport and during use is extremely low. This can be achieved in particular by the first solid material.

By the fact that the first molten polymer mass comprises the first vinyl polymer, such as recycled polypropylene, it can be enabled, despite the high stability, that panels produced from the polymer mass can be very elastic or resilient and/or bendable, respectively, which allows a comfortable impression when walking on it and further can reduce occurring noises when walking on it compared to conventional materials, thus an improved impact sound can be realized.

Vinyl polymers in particular also offer the advantage that the products made from them can be recycled very easily. This provides a further opportunity to reduce production costs.

Preferably, it may be provided that the first polymer mass comprises at least one polymeric additive selected from the group consisting of an olefin-based thermoplastic elastomer, a first vinyl homopolymer, a first vinyl copolymer, a first adhesion promoter, and a second vinyl copolymer, wherein the first polymer mass preferably comprises at least two polymeric additives, more preferably at least three, more preferably at least four, particularly preferably at least five. As a result, the properties of the carrier layer can be further improved.

Preferably, it may be provided that the first polymer mass comprises the polymeric additive in a total amount in a range of greater than or equal to 0 wt.-% to less than or equal to 25 wt.-%, preferably greater than or equal to 10 wt.-% to less than or equal to 20 wt.-%, particularly preferably greater than or equal to 15 wt.-% to less than or equal to 17 wt.-%, based on the total weight of the first polymer mass.

Preferably, it may be provided that the first polymer mass comprises as a polymeric additive the olefin-based thermoplastic elastomer in a range of greater than or equal to 1 wt.-% to less than or equal to 10 wt.-%, preferably greater than or equal to 3 wt.-% to less than or equal to 8 wt.-%, particularly preferably greater than or equal to 5 wt.-% to less than or equal to 7 wt.-%, based on the total weight of the first polymer mass.

Preferably, it may be provided that the first polymer mass comprises as a polymeric additive the first vinyl homopolymer, wherein the first vinyl homopolymer comprises in particular a polypropylene homopolymer, wherein the first polymer mass comprises the first vinyl homopolymer in a range of greater than or equal to 1 wt.-% to less than or equal to 10 wt.-%, preferably greater than or equal to 3 wt.-% to less than or equal to 7 wt.-%, particularly preferably greater than or equal to 4 wt.-% to less than or equal to 6 wt.-%, based on the total weight of the first polymer mass.

Preferably, it may be provided that the first polymer mass comprises as a polymeric additive the first vinyl copolymer, wherein the first vinyl copolymer preferably comprises a propylene-based vinyl copolymer, more preferably a propylene-ethylene random copolymer, wherein the first polymer mass comprises the first vinyl copolymer in a range of greater than or equal to 1 wt.-% to less than or equal to 5 wt.-%, particularly preferably greater than or equal to 2 wt.-% to less than or equal to 4 wt.-%, based on the total weight of the first polymer mass.

Preferably, it may be provided that the first polymer mass comprises as a polymeric additive the first adhesion promoter, wherein the first adhesion promoter preferably comprises a propylene-based adhesion promoter, particularly preferably a maleic anhydride-grafted polypropylene, wherein the first polymer mass comprises the first adhesion promoter in a range of greater than or equal to 1 wt.-% to less than or equal to 5 wt.-%, particularly preferably greater than or equal to 2 wt.-% to less than or equal to 4 wt.-%, based on the total weight of the first polymer mass.

Preferably, it may be provided that the first polymer mass comprises as a polymeric additive the second vinyl copolymer, wherein the second vinyl copolymer preferably comprises a polyethylene-based vinyl copolymer, more preferably a linear low density polyethylene (LLDPE), wherein the first polymer mass comprises the second vinyl copolymer in a range of greater than or equal to 0.5 wt.-% to less than or equal to 3 wt.-%, particularly preferably greater than or equal to 1 wt.-% to less than or equal to 2 wt.-%, based on the total weight of the first polymer mass.

Preferably, it may be provided that the first polymer mass comprises, based on the total weight of the first polymer mass, the first solid material in a range of greater than or equal to 50 wt.-% to less than or equal to 70 wt.-%, the first vinyl polymer in a range of greater than or equal to 50 wt.-% to less than or equal to 10 wt.-%, the olefin-based thermoplastic elastomer in a range of greater than or equal to 1 wt.-% to less than or equal to 10 wt.-%, the first vinyl homopolymer in a range of greater than or equal to 1 wt.-% to less than or equal to 10 wt.-%, the first vinyl copolymer in a range of greater than or equal to 1 wt.-% to less than or equal to 5 wt.-%, the first adhesion promoter in a range of greater than or equal to 1 wt.-% to less than or equal to 5 wt.-%, and the second vinyl copolymer in a range of greater than or equal to 0.5 wt.-% to less than or equal to 3 wt.-%.

It could be shown that this composition is particularly suitable for the method described above, since the plate-shaped carriers thus obtained have particularly good mechanical properties and at the same time the method can be carried out at particularly high line speeds.

Preferably, it can be provided that the second polymer mass comprises a third polymer, wherein the third polymer is a vinyl copolymer, wherein the third vinyl copolymer is preferably a vinyl copolymer selected from the group consisting of a propylene-based vinyl copolymer, a vinyl terpolymer and mixtures thereof, particularly preferably selected from the group consisting of a propylene-ethylene random copolymer, a polypropylene-ethylene-butylene copolymer, an ethylene-propylene-diene monomer rubber and mixtures thereof.

In this way, it can be achieved that the plate-shaped carrier can be provided with further layers particularly easily. In particular, it can be achieved that the surface of the plate-shaped carrier has particularly good sealing properties. For example, it can be achieved in this way that the surface of the plate-shaped carrier has a melting point which is above a necessary sealing temperature. In addition, it can be achieved that the sealable layer bonds well to the carrier layer and the plate-shaped carrier has good overall mechanical properties.

Preferably, it may be provided that the third vinyl copolymer comprises a mixture comprising propylene-ethylene random copolymer and polypropylene-ethylene-butylene copolymer.

Preferably, it may be provided that the third vinyl copolymer has a melting point measured according to ISO 11357-3 in a range from greater than or equal to 110° C. to less than or equal to 160° C., preferably greater than or equal to 120° C. to less than or equal to 150° C., more preferably greater than or equal to 130° C. to less than or equal to 140° C.

Preferably, it may be provided that the third vinyl copolymer has a Vicat softening temperature (A50) measured according to ISO 306 in a range from greater than or equal to 100° C. to less than or equal to 120° C., preferably greater than or equal to 105° C. to less than or equal to 115° C.

Preferably, it may be provided that the third vinyl copolymer has a melt flow rate measured according to ISO 1133-1 (230° C./2.16 kg) in a range from greater than or equal to 5 g/10 min to less than or equal to 7 g/10 min, particularly preferably 5.5 g/10 min to less than or equal to 6 g/10 min.

Preferably, it may be provided that the third vinyl copolymer has a seal initiation temperature in a range of greater than or equal to 75° C. to less than or equal to 125° C., preferably greater than or equal to 80° C. to less than or equal to 115° C., particularly preferably greater than or equal to 85° C. to less than or equal to 100° C.

In the sense of the present application, seal initiation temperature means the minimum temperature at which the third vinyl copolymer can be sealed to a carrier.

Preferably, it can be provided that the seal initiation temperature of the third vinyl copolymer is at least 10° C. lower than the melting temperature of the third vinyl copolymer, preferably at least 20° C. lower, particularly preferably at least 25° C. lower.

By the above-described parameters, it can be achieved that the sealable layer can be well sealed with a film without causing the sealable layer to melt and/or the plate-shaped carrier to deform.

Preferably, it may be provided that the second polymer is a thermoplastic vinyl polymer.

Preferably, it may be provided that the propylene-ethylene random copolymer has an ethylene content in a range of greater than or equal to 1 wt.-% to less than or equal to 10 wt.-%, preferably greater than or equal to 2 wt.-% to less than or equal to 6 wt.-%, for example 4 wt.-%, based on the propylene-ethylene random copolymer.

Preferably, it may be provided that the propylene-ethylene random copolymer has a Vicat softening temperature (A50) measured according to ISO 306 in a range from greater than or equal to 90° C. to less than or equal to 120° C., preferably greater than or equal to 100° C. to less than or equal to 110° C.

Preferably, it may be provided that the polypropylene-ethylene-butylene copolymer has a melting point measured according to ISO 11357-3 in a range from greater than or equal to 110° C. to less than or equal to 150° C., preferably greater than or equal to 120° C. to less than or equal to 130° C.

Preferably, it may be provided that the polypropylene-ethylene-butylene copolymer has a Vicat softening temperature (A50), measured according to ISO 306, in a range from greater than or equal to 80° C. to less than or equal to 110° C., preferably greater than or equal to 90° C. to less than or equal to 100° C.

Preferably, it may be provided that the melt flow rates MFR (230° C., 2.16 kg) of the first polymer and of the second polymer, measured according to EN ISO 1133-1, have a difference with respect to each other of less than or equal to 3 g/10 min, preferably less than or equal to 2 g/10 min, particularly preferably less than or equal to 1 g/10 min.

Preferably, it may be provided that the second polymer mass comprises the third vinyl copolymer in a range from greater than or equal to 50 wt.-% to less than or equal to 100 wt.-%, preferably greater than or equal to 55 wt.-% to less than or equal to 80 wt.-%, more preferably greater than or equal to 55 wt.-% to less than or equal to 70 wt.-%, particularly preferably greater than or equal to 60 wt.-% to less than or equal to 65 wt.-%, based on the weight of the second polymer mass.

Preferably, it may be provided that the second polymer mass comprises a vinyl alkyl acrylate copolymer, preferably a vinyl butyl acrylate copolymer, more preferably an ethylene butyl acrylate.

Preferably, it may be provided that the second polymer mass comprises the vinyl alkyl acrylate copolymer in a range of greater than or equal to 0 wt.-% to less than or equal to 50 wt.-%, preferably greater than or equal to 10 wt.-% to less than or equal to 40 wt.-%, more preferably greater than or equal to 15 wt.-% to less than or equal to 30 wt. %, based on the weight of the second polymer mass.

Preferably, it may be provided that the second polymer mass comprises a masterbatch, preferably a vinyl polymer-based masterbatch, particularly preferably an LDPE-based masterbatch, wherein the masterbatch preferably comprises white pigment, preferably titanium dioxide.

Advantageously, this allows the sealable layer to be used as a decorative substrate, too. It can thus be achieved that a decoration applied onto the plate-shaped carrier shows to advantage particularly well.

Preferably, it may be provided that the second polymer mass comprises the masterbatch in a range from greater than or equal to 0 wt.-% to less than or equal to 10 wt. %, preferably greater than 2.5 wt.-% to less than 7.5 wt.-%, for example 5 wt.-%, based on the weight of the second polymer mass.

Preferably, it may be provided that the second polymer mass comprises a second solid material, wherein the second solid material is preferably selected from the group consisting of calcium carbonate and kaolin.

Preferably, it may be provided that the second polymer mass comprises the second solid material in a range of greater than or equal to 0 wt.-% to less than or equal to 50 wt.-%, preferably greater than or equal to 5 wt.-% to less than or equal to 45 wt.-%, more preferably greater than or equal to 15 wt.-% to less than or equal to 40 wt.-%, particularly preferably greater than or equal to 25 wt.-% to less than or equal to 35 wt.-%, based on the weight of the second polymer mass.

Preferably, it may be provided that the second polymer mass comprises the third vinyl copolymer in a range from greater than or equal to 50 wt.-% to less than or equal to 100 wt.-%, the vinyl-alkyl acrylate copolymer in a range from greater than or equal to 0 wt.-% to less than or equal to 50 wt.-%, the masterbatch in a range of greater than or equal to 0 wt.-% to less than or equal to 10 wt.-%, and the second solid material in a range of greater than or equal to 0 wt.-% to less than or equal to 50 wt.-%, based on the total weight of the second polymer mass.

It could be shown that this composition is particularly suitable for the process described above, since the plate-shaped carriers thus obtained can be particularly well provided with decorations.

Preferably, it can be provided that in step a) a third molten polymer mass is additionally provided and the plate-shaped carrier formed in step d) additionally has at least one backing layer contacting the carrier layer and comprising the third polymer mass.

Thus, it can advantageously be achieved that the plate-shaped carrier obtained warps to a particularly little extend. By producing the backing layer together with the other layers of the plate-shaped carrier, it can also be achieved that a further method step for applying the backing layer can be dispensed with. Furthermore, it can be achieved that the backing layer is particularly well bonded to the carrier layer, so that the plate-shaped carrier is particularly dimensionally stable. In addition, the backing layer can enable a particularly good bondability of the plate-shaped carrier.

Preferably, it may be provided that the third polymer mass comprises a third solid material, wherein the third solid material preferably comprises a layered silicate powder, wherein the third solid material particularly preferably comprises talc. The third solid material of the third polymer mass may preferably be defined exactly as the first solid material of the first polymer mass. In a preferred embodiment, it may be provided that the third solid material is the same as the first solid material.

Preferably, it may be provided that the third polymer mass comprises the third solid material in a range of greater than or equal to 10 wt.-% to less than or equal to 70 wt.-%, preferably greater than or equal to 20 wt.-% to less than or equal to 60 wt.-%, particularly preferably greater than or equal to 30 wt.-% to less than or equal to 50 wt.-%, based on the total weight of the third polymer mass.

Preferably, it may be provided that the third polymer mass comprises a second vinyl polymer, wherein the second vinyl polymer preferably comprises a recycled vinyl polymer, more preferably a polypropylene, most preferably a recycled polypropylene.

In this way it can advantageously be achieved that the backing layer builds up a counteraction effect particularly well. Without being bound by any theory, it is assumed that this can be achieved by the higher shrinkage tendency of the third polymer mass used compared to the first polymer mass.

Preferably, it may be provided that the third polymer mass comprises the second vinyl polymer in a range of greater than or equal to 30 wt.-% to less than or equal to 90 wt.-%, preferably greater than or equal to 40 wt.-% to less than or equal to 80 wt.-%, particularly preferably greater than or equal to 50 wt.-% to less than or equal to 70 wt.-%, based on the total weight of the first polymer mass.

Preferably, it may be provided that the third polymer mass comprises at least a second adhesion promoter, wherein the second adhesion promoter is preferably selected from a propylene-based adhesion promoter, an ethylene-based copolymer and mixtures thereof, particularly preferably a maleic anhydride-grafted polypropylene, an ethyl butyl acrylate and mixtures thereof.

In this way it can advantageously be achieved that the backing layer is particularly well bonded to the carrier layer, so that the plate-shaped carrier has particularly good mechanical properties. Furthermore, it can be achieved in this way that the plate-shaped carrier can be bonded particularly well. In particular, a particularly good adhesion for conventional adhesives, such as silane-modified polymer adhesives (SMP) or polyurethane-based adhesives (PU), can be achieved for such plate-shaped carriers.

Preferably, it may be provided that the third polymer mass comprises the second adhesion promoter in a range of greater than or equal to 0 wt.-% to less than or equal to 5 wt.-%, preferably greater than or equal to 1 wt.-% to less than or equal to 3 wt.-%, for example 2 wt.-%, based on the total weight of the first polymer mass.

Preferably, it may be provided that the third polymer mass comprises the third solid material in a range of greater than or equal to 10 wt.-% to less than or equal to 70 wt.-%, the second vinyl polymer in a range of greater than or equal to 30 wt.-% to less than or equal to 90 wt.-%, and the second adhesion promoter in a range of greater than or equal to 0 wt.-% to less than or equal to 5 wt.-%, based on the total weight of the third polymer mass.

To produce the molten polymer mass, one or more so-called dry blends can be melted, by way of example, i.e. dry plastic powders with additives. These materials can be provided in method step a), for example by a screw extruder, in which the polymeric material or the dryblends are melted by means of pressure, temperature and shear forces, optionally homogenized and passed on to method step b).

In method step b), the molten polymer masses are extruded, wherein in particular each polymer mass is extruded by use of a separate extruder. For example, the molten polymer masses can be extruded into a feed block or a multi-channel die. In this process, the molten polymer masses are layered one on top of the other. In method step c), the layered molten polymer masses are expelled through a die. The molten and plasticized polymer masses are forced through a die by means of pressure, wherein a part of the final product geometry is suitably predetermined by the choice of the die geometry. For panels, the choice of a slot die or a wide slot die has proved particularly suitable, which has a ratio of slot width to slot height of more than approximately 4:1 (width:height), preferably more than 10:1, and further preferably more than 20:1. In particular, for the panels according to the disclosure, this rather wide and narrow die geometry already allows a large part of the carrier structure to be preformed, which can keep the subsequent effort for calibrating the extruded polymeric mass small. In particular, it may be advantageous for the wide slot die to include means for adjusting the die gap. These means can be used, for example, to extremely flatten the edge areas of the extruded flat strand, so that flatter joints between different panels can be formed in these edge areas in a further method step compared to average panel thicknesses without a large calibration effort.

Preferably, it can be provided that the molten polymer masses are extruded in such a way that the carrier layer has a layer thickness of greater than or equal to 60% to less than or equal to 95% of the thickness of the plate-shaped carrier, in particular less than or equal to 90%. In this way, it can be achieved that the plate-shaped carrier is particularly stable.

Preferably, it can be provided that the molten polymer masses are extruded in such a way that the sealable layer has a layer thickness of greater than or equal to 5% to less than or equal to 15% of the thickness of the plate-shaped carrier. In this way, it can be achieved that the plate-shaped carrier is particularly suitable for the application of a decoration.

Preferably, it can be provided that the molten polymer masses are extruded in such a way that the backing layer has a layer thickness of greater than or equal to 5% to less than or equal to 15% of the thickness of the plate-shaped carrier. In this way a particularly low deformation of the plate-shaped carrier can be achieved.

In method step d), the calibration of the molten polymer masses layered on top of each other takes place with the formation of a plate-shaped carrier comprising at least one carrier layer comprising the first polymer mass and a sealable layer contacting the carrier layer and comprising the second polymer mass.

Preferably, it may be provided that the calibration is carried out by means of an arrangement of a plurality of rotatable rollers, wherein the individual rollers are arranged one above the other or one behind the other and each individual roller forms with adjacent rollers at least one calibration gap through which the molten polymer masses layered on top of each other are passed, wherein the calibration gap heights are variably adjustable by means of a horizontal and/or vertical movement of individual rollers during the production process.

In particular, the integration of the roller calibration step into the production according to the disclosure allows the proportion of air inclusions at the panel surface to be reduced, which can probably be attributed to improved removal of air present in the carrier and an improved exclusion of air in the roller gaps. In addition to the direct process advantages, the flexible method using individually controllable rollers can also reduce the setup and run-in times of the plant, which results in higher process efficiency.

The forming and calibration of the panels is thus not carried out by using a flat press, but by using rollers. The molten polymer masses layered on top of each other are guided through the gaps between the rollers formed by the roller arrangement, and due to the mechanical load in the roller gaps, the mass is squeezed and brought to the desired thickness. In addition to the mechanical forces exerted by the rollers, the polymer masses can also be cooled at the same time. This can be done via the rollers or by means of other coolants, e.g. by blowing air onto them. The fact that an efficient calibration can be obtained by means of the roller arrangement and by means of the roller gaps is surprising, since the viscoelastic properties of the molten polymeric masses tend to suggest the use of presses with a large surface area. The rather small active calibration surface in the roller gaps compared to the presses should rather lead to insufficient calibration at small calibration surfaces due to the rheological properties of the polymer mass, such as thixotropic properties. Surprisingly, however, this is not the case, so that an efficient and timesaving production can be ensured via the arrangement of several rollers. Multiple rollers in this context mean more than four, for example five rollers, wherein the multiple rollers form at least 3 or 4 separate gaps. Preferably, the gaps are arranged one behind the other, separated by the rollers. In particular, it is also provided in accordance with the disclosure that the calibration of the carrier is carried out only by passing the molten carrier material through the roller gaps. In this respect, it can also be provided according to the disclosure that the method can dispense entirely with the use of plate-shaped pressing devices, such as belt presses. It can also be provided that the calibration of the carriers is only carried out by the rollers arranged one behind the other in direct succession at one location of the device. In this case, a division of the roller arrangement, for example first two roller gaps, followed by, for example, a cooling section and then again one or two roller gaps, would not be in accordance with the disclosure. According to the disclosure, it can further be provided that the calibration takes place directly downstream the extrusion of the carrier material and that further significant calibration or smoothing steps are omitted.

The calibration gap heights can be variably adjusted via a horizontal or vertical movement of individual rollers during the production process. This means that a change in the position of an individual roller also changes the gap dimensions of the gap or gaps formed to adjacent rollers. In this way, the gap dimensions and thus the carrier height can be influenced by the distance between the rollers. Also, the take-off or impingement angle of the molten polymer material with respect to the roller can be changed via the relative height of the individual rollers to each other, which results in different mechanical forces, possibly different cooling properties and areas, as well as possible air entrapment between the roller and the polymer. A roller is variably adjustable during the production process if the roller can change its X and/or Y position as the polymeric material passes through it. The individual gaps can be controlled either isobarically or isochorically during the production process. The former mode of operation specifies a mechanical force applied onto the polymeric substrate material in the roller gap, whereas the latter mode of operation is based on a constant thickness of the gap between two rollers. In the former mode of operation, the roller positions are thus dynamically adjusted, whereas in the latter the roller positions are kept rather constant relative to each other.

It is particularly advantageous if different calibration gaps can be set between several or all rollers. This makes it possible to counteract the fluctuations in the carrier thickness that occur during production and possibly a not entirely homogeneous cooling performance of the individual rollers. Each of the rollers can simply "run along" or support the conveying of the film, which is why it can also be provided that the rollers can be driven individually or together. Depending on the roller positioning, the carrier material can pass through the rollers in a quasi wavy line and thus comes into contact once with one side and once with the other side of successive rollers. To ensure that the influence of the contact surfaces between the roller and the carrier surface is essentially the same for both sides of the carrier, it may be provided that the diameter of the main rollers and the downstream rollers is selected so that the contact surfaces between the carrier and the rollers are essentially the same on both sides of the carrier. When passing around a respective roller, only one side of the extrudate can be cooled at a time, which may cause stresses in the plate. In order to counteract this uneven cooling profile, for example, a more uniform cooling effect onto the carrier can be actively adjusted at the rear side by introducing cold air (e.g. Airknife).

Since the cooling behavior can vary across the width of the extrudate and in order to counteract a neck-in effect, it is also possible to work with heat in the edge area on the opposite side. IR emitters, for example, can be used for this purpose. Other measures for uniform cooling the molded polymer mass can include vacuum boxes that ensure air-free application of the polymer melt onto the roller, or so-called edge pinning, in which the edge area is fixed electrostatically to the roller.

In the method according to the disclosure, the carrier not only has a particularly smooth surface with low roughness, but also a surface with particularly few air inclusions. These two factors can contribute to a particularly reproducible and high-quality decorated carrier end product. Without being bound by theory, due to the relatively small volume in the roller gap between the pairs of rollers, the air in the carrier can escape much better compared to a flat press. This can lead to carriers and carrier surfaces with particularly low air entrapment. By means of a second, introduced white colored polymer melt on the upper side of the molten and extruded polymer, a smooth, void-free printing subsurface can be applied, which, contrary to the solutions in the prior art, does not have to be coated with duroplasts different from polymers. The advantage here is that this consists of an almost identical thermoplastic polymer matrix of the carrier plate. The latter can be very advantageous for efficient recycling.

In one embodiment, it may be provided that a decoration imitating a decorative template is applied to at least a partial area of the sealable layer. The decorative template can be applied at the fully calibrated carrier after it has passed through the roller arrangement or even before it has passed through the last roller calibration gap. In the method according to the disclosure, the carrier not only has a particularly smooth surface with low roughness, but also a surface with particularly few air inclusions. These two factors can contribute to a particularly reproducible and high-quality decorated carrier end product. Without being bound by theory, due to the relatively small volume in the roller gap between the pairs of rollers, air in the carrier can escape much better compared to a flat press. This can lead to carriers and carrier surfaces with particularly low air entrapment. By means of a second, introduced white colored polymer melt on the upper side of the molten and extruded polymer, a smooth, void-free printing subsurface can be applied, which, contrary to the solutions in the prior art, does not have to be coated with duroplasts different from polymers. The advantage here is that this consists of an almost identical thermoplastic polymer matrix of the carrier plate. The latter can be very advantageous for efficient recycling.

Furthermore, a decoration reproducing a decorative template is applied to at least a partial area of the carrier. The decoration can be applied, for example, by means of so-called direct printing. In the sense of the disclosure, the term "direct printing" is understood to mean the application of a decoration directly onto the carrier of a panel or onto a non-printed fiber material layer or a decoration subsurface applied onto the carrier. Different printing techniques, such as flexographic printing, offset printing or screen printing, may be used. In particular, inkjet or laser printing processes, for example, can be used as digital printing techniques.

For example, in order to imitate or reproduce a decorative template in a three-dimensional form in a particularly detailed and highly accurate manner, the decoration can be applied after passing through the roller arrangement in a manner identical to the template. In particular, the three-dimensional decoration data can be provided by three-dimensionally scanning the decorative template by means of electromagnetic radiation, for example by a three-dimensional scanner (3D scanner). A plurality of decorative layers with at least partially different surface applications can be successively applied on the basis of the three-dimensional decoration data provided.

Furthermore, the decorative layers can be formed from an ink and/or paint that is, in particular, radiation-curable. For example, a UV-curable ink or paint may be used. In this embodiment, a particularly detailed and consistent reproduction of the decorative template can be achieved. On the one hand, a synchronous pore can be achieved with high precision in this way without the provision of further measures. A synchronous pore can be, in particular, a pore or another type of structure that is spatially arranged exactly where it is visually represented by a haptic structuring that matches the optical decoration features. This is essentially automatically the case in this embodiment, since the structural design is generated precisely by the paint or ink. In addition, decorative templates, such as wood-based materials, often exhibit a variation of the color impression not only along their width or length but also along their depth. This color impression or color gradient can also be reproduced in particular detail in this embodiment, which also makes the overall impression of the panel appear even more identical. In particular, if the paint or ink used is radiation-curable, a particularly rapid solidification can be achieved, such that the plurality of layers can be applied to one another quickly, which can also make the overall process realizable in a shorter time and thus particularly cost-effective.

In the sense of the disclosure, the term radiation-curable ink is to be understood as a composition which is essentially free of a binder and/or a filler and includes color pigments, which can be at least partially polymerized induced by electromagnetic radiation of suitable wavelength, such as UV radiation or electron radiation.

Accordingly, the term radiation-curable ink is to be understood in the sense of the disclosure as a composition which is essentially free of a filler and includes color pigments and which can be at least partially polymerized induced by electromagnetic radiation of suitable wavelength, such as, for example, UV radiation or electron radiation.

In this context, the decorative layers can each be applied in thicknesses of 5 µm to 10 µm.

In addition to a positive image in terms of color and/or structure, it may also be possible to apply a corresponding negative image of the decorative template. In detail, as is known, for example, from a positive or negative staining for wood-based materials, the color impression of, for example, a grain can be reversed by the use of digital data, so that a negative is produced with respect to the color or, in particular, lighter and darker areas. In addition to the color impression, the same is also possible for the applied structure, so that a negative can also be realized with regard to the structural design. Such effects, too, can be easily integrated into a production process on the basis of digital three-dimensional data and without lead times or retooling.

In a preferred embodiment of the method, the calibration in method step d) can be carried out by use of at least one main roller pair comprising two rollers with a larger diameter and at least three calibration rollers arranged one behind the other with a smaller diameter than that of the main roller pair. To obtain a surface structure that is as uniform as possible for receiving the decoration, it has proved particularly advantageous to apply mechanical and, if necessary, thermal forces to the carrier in a non-uniform manner by means of different roller sizes. This measure can lead to particularly smooth carrier surfaces, which can be provided with decorations particularly easily and reproducibly. The main part of the desired and necessary deformation can be carried out by the larger pair of rollers, whereas the other, smaller calibration rollers exert only small forces to obtain a uniformly calibrated product and transport air out of the carrier in a controlled manner. As a result, high line speeds can be achieved while maintaining only minor thickness variations of the produced carrier. The roller diameters differ in diameter when the corresponding diameters of the main and calibrating rollers differ by at least 10%. The above arrangement results in, for example, the following gap arrangements for the molten polymer material. Mandatorily, the molten polymer material passes through the gap between the main rollers, and at least the two gaps between the at least three calibration rollers. For example, the arrangement may have a total of 8, preferably 6, further preferably 4 calibration rollers. This number of individual gaps has been found to be particularly suitable for obtaining decorated panels with improved surface and decorative properties.

Within a further embodiment of the method, the height of the calibration gap of the main roller pair $H_H$ may differ by greater than or equal to 10% and less than or equal to 50% from the heights of the calibration gaps of the calibration rollers $H_K$. The above-mentioned gap height ratio between the main and calibration rollers has proved to be particularly suitable for obtaining particularly smooth carrier surfaces and for obtaining mechanically particularly low-stress carriers. The force acting on the carrier can also be determined by this specification, so that a force distribution particularly suitable for the production of decorated panels is specified for the roller arrangement. This results in particularly favorable properties both in terms of the presence of air inclusions and in terms of the occurrence of stress cracks in the carrier material. In addition, the distance of the mechanical force application to the forming of the carrier, in relation to the point of application of the decoration, also appears to play an important role. In this regard, it has been found to be particularly suitable in a preferred embodiment that the height of the calibration gap(s) is (are) smaller than the height of the main roller gap by greater than or equal to 10% and less than or equal to 50%. This can contribute to high line speeds without loss of surface quality of the decorated panel.

In another aspect of the method, the height of the last and/or penultimate calibration gap can be selected in such a way that the carrier is compressed by a factor of less than or equal to 10% and greater than or equal to 3% in its height. The above compression ratio has proved to be particularly advantageous for obtaining particularly smooth carrier surfaces with particularly low air inclusions. The ratio can be determined, for example, by measuring the thickness of the carrier before and after the gap pass. The desired compression ratio can be set via the height profile ratio of the calibration roller gaps or also via the force to be applied in the individual roller gaps.

In a further, preferred embodiment of the method, the roller arrangement can have at least four further calibration rollers in addition to the main roller pair, wherein one of the roller gaps of the calibration rollers is operated isobarically. In contrast to the mode of operation with constant gap thicknesses between the calibration rollers, it has proved particularly advantageous for the surface properties of the carriers that at least one of the gaps is operated isobarically, i.e. with constant force acting on the carrier. This makes it possible to achieve very fast process times while maintaining the smoothest possible carrier surface. In the sense of the disclosure, isobaric mode of operation means that the force acting on the carrier in the roller gap fluctuates by less than 10%, preferably less than 5%, and more preferably less than 2.5%, via the control of the roller spacings during the production of the carrier. The forces to produce a carrier can be measured, for example, by a force sensor on or in the roller or, alternatively, by one or more force sensors in the carrier material.

Within a preferred aspect of the method, the main rollers and the calibration rollers may be equipped to be temperature controlled and the temperature controlled surface area of the calibration rollers may be greater by a factor of greater than or equal to 1.1 up to less than or equal to 2.5 compared to that of the main rollers. In addition to the mechanical treatment of the molten polymer mass, a thermal treatment of the carrier can also take place simultaneously by means of the roller arrangement. The thermal treatment may in principle consist of partial heating or partial cooling of the carrier. Advantageously, the molten material is cooled by the rollers at the roller surface. This can be achieved, for example, in that the individual rollers have a supply of heat transfer media, such as a cooling liquid, inside the roller. Furthermore, it is advantageous that the surface temperatures of the individual rollers of the roller arrangement can be controlled separately. This can contribute to a particularly reproducible and gentle forming and cooling process. The above-mentioned ratio of the cooling surfaces between the main and calibration rollers has proved to be particularly suitable for obtaining particularly mechanically low-stress decorated panels with particularly few air inclusions. Without being bound by theory, the higher-quality decorations result from the amount of heat dissipated in a controlled manner in the individual steps, which is also proportional to the surface area of the roller pairs. Within this range, it is also possible to achieve very high web speeds and particularly efficient expulsion of air inclusions from the carriers. Furthermore, the individual roller temperatures, and consequently the cooling rates achievable therewith, can be selected as a function of the mechanical force exerted on the carrier. Greater force effects, for example due to high compressions of the carrier material, can be accompanied by a higher temperature gradient between the roller and the carrier, so that in total a mechanically less stressed carrier is obtained.

Preferably, it may be provided that the method further comprises the method steps of: e) applying a film onto at least a partial area of the sealable layer of the plate-shaped carrier. This allows the plate-shaped carrier to be further modified to impart desired properties thereto, in particular optical and haptic properties.

In one embodiment, it may be provided that the method comprises a plurality of method steps e). Accordingly, it may be provided that, in the method, a plurality of films are applied onto at least a partial area of the sealable layer of the plate-shaped carrier. In particular, it may be provided that a first applied film contacts the sealable layer, and each further applied film contacts the corresponding previously applied film.

Preferably, it can be provided that the film comprises at least one top layer, wherein the top layer preferably has an inner side, an outer side and a decorative layer optionally applied to the inner side of the top layer, wherein the film is applied onto the sealable layer in such a way that the outer side of the top layer faces away from the plate-shaped carrier. In this way, the plate-shaped carrier can be provided with a decoration in a particularly simple and efficient manner.

In particular, the film may comprise the decorative layer if no decoration is otherwise applied to the sealable layer of the carrier plate in the method.

Preferably, it may be provided that the top layer comprises a fourth polymer, wherein the fourth polymer is a vinyl polymer, preferably consists essentially thereof, wherein the third vinyl polymer may be a homopolymer or a copolymer, wherein the vinyl polymer preferably comprises a polypropylene-based vinyl polymer, more preferably a polypropylene copolymer, preferably selected from the group consisting of a propylene-ethylene random copolymer, a propylene-ethylene block copolymer, and a polypropylene-ethylene-butylene copolymer.

Preferably, it may be provided that the top layer may have a multilayer structure of different vinyl polymers, in particular different propylene polymers.

Preferably, it can be provided that the top layer has a thickness in a range from greater than or equal to 10 μm to less than or equal to 1000 μm, preferably greater than or equal to 50 μm to less than or equal to 750 μm, particularly preferably from greater than or equal to 100 μm to less than or equal to 500 μm.

It could be shown that such top layers are particularly suitable for the method described above, since on the one hand they have good wear properties and on the other hand they are easy to process and can have correspondingly applied decorations.

In a preferred embodiment, it can be provided that the top layer of the film comprises a surface structuring. This means that a structuring of the top layer can be dispensed with in the further course of the method. Thus, the method can be operated in a particularly flexible manner.

Preferably, it can be provided that the decorative layer comprises a decoration that simulates a decorative template. The decoration may have been applied by so-called direct printing. In the sense of the disclosure, the term "direct printing" is understood to mean the application of a decoration directly onto the inner side of the top layer. Various printing techniques, such as flexographic printing, offset printing or screen printing, may be used. In particular, inkjet or laser printing processes, for example, can be used as digital printing techniques. Particularly preferably, it may be provided that the decoration has been produced by roll-to-roll digital printing, gravure printing or flexographic printing by use of a counter-printing process.

Preferably, it may be provided that the decorative layer comprises thermally sealable printing inks. In the sense of the present disclosure, thermally sealable printing inks also mean, in particular, laminable inks. For example, it may be provided that the laminable inks comprises a radiation-curable ink preferably in an amount, based on the laminable ink, from ≥50 wt.-% to ≤99 wt.-%, preferably from ≥70 wt.-% to ≤95 wt.-%, more preferably from 80 wt.-% to 90 wt.-%, and a thermally activatable matrix material preferably in an amount, based on the laminable ink, from ≥1 wt.-% to ≤50 wt.-%, preferably ≥5 wt.-% to ≤30 wt.-%, particularly preferably from ≥10 wt.-% to ≤20 wt.-%, wherein the matrix material comprises at least one thermally activatable polymer, preferably in an amount, based on the laminable ink, from ≥1 wt.-% to ≤30 wt.-%, preferably ≥5 wt.-% to ≤20 wt.-%, particularly preferably from ≥10 wt.-% to ≤15 wt.-%.

In this way, it can be achieved in particular that a laminating adhesive or a laminating layer can be dispensed with.

In a preferred embodiment, it can be provided that the film comprises a laminating layer, wherein the laminating layer is preferably applied onto the decorative layer applied to the inside of the top layer, wherein the laminating layer is particularly preferably bonded to the decorative layer via a laminating adhesive. In this way it can be achieved that the decorative layer has to meet fewer special requirements.

Preferably, it may be provided that the laminating layer comprises a fourth vinyl copolymer, preferably a vinyl terpolymer, more preferably a polypropylene-based vinyl copolymer, particularly preferably a polypropylene-ethylene-butylene copolymer.

Preferably, it may be provided that the fourth vinyl copolymer is defined in the same way as the third vinyl copolymer. Particularly preferably, it may be provided that the fourth vinyl copolymer is the same as the third vinyl copolymer.

In an alternative preferred embodiment, it may be provided that the film does not comprise a laminating layer. In this way it can be achieved that the film is easier to produce.

Preferably it can be provided that the film is applied during the calibration in method step d), wherein preferably the film is applied downstream the first pair of rollers, and preferably upstream the sixth calibration roller, more preferably upstream the fifth calibration roller, particularly preferably upstream the fourth calibration roller, in particular upstream the third calibration roller.

In this way it can be achieved, on the one hand that the film is particularly well bonded to the plate-shaped carrier during the calibration and, on the other hand, a special temperature control of the plate-shaped carrier can essentially be dispensed with. This makes the method particularly simple and cost-saving.

In an alternative, preferred embodiment, it can be provided that the film is applied after calibration in method step d), wherein preferably the film is applied by a calender downstream of the calibration step. In this way, the method step can be mechanically decoupled from the previous method steps. Here, the plate-shaped carrier can still have residual heat, thus saving energy. At the same time, the mechanically decoupled implementation may result in that the process control is particularly simple.

Preferably, it may be provided that the film is provided in the form of a rolled product. For this purpose, it can preferably be provided that the film is provided with an unwinding station, wherein the unwinding station is preferably equipped with an automatic web edge control. Preferably, it may be provided that the unwinding station is configured redundant, so that the provision of the film comprises an automatic reel change at the end of a film reel, wherein the end of one film is connected to the beginning of the new one, in particular by an automatic splicing process.

Preferably, it can be provided that several films are applied in parallel side by side over the width of the plate-shaped carrier, wherein the unwinding station is in particular a double unwinding station. This method is particularly suitable for very wide plate-shaped carriers, since the process control can be simplified in this way.

Preferably, it can be provided that the film is preheated before application to at least a partial area of the sealable layer of the plate-shaped carrier, preferably to a temperature in a range from greater than or equal to room temperature to less than or equal to 160° C., more preferably greater than or equal to 50° C. to less than or equal to 155° C., still more preferably greater than or equal to 100° C. to less than or equal to 150° C., particularly preferably from greater than or equal to 125° C. to less than or equal to 145° C. In this way, it can be achieved that the film adheres better to the plate-shaped carrier.

Preferably, it can be provided that the preheating of the film is carried out with electromagnetic radiation, in particular with radiation in the infrared and/or near-infrared range.

Preferably, it can be provided that the sealable layer of the plate-shaped carrier has a temperature in a range from greater than or equal to 105° C. to less than or equal to 160° C., preferably greater than or equal to 110° C. to less than or equal to 140° C., more preferably greater than or equal to 115° C. to less than or equal to 130° C., particularly preferably greater than or equal to 120° C. to less than or equal to 125° C., when the film is applied. In this way, it can be achieved that the film adheres better to the plate-shaped carrier.

Preferably, it may be provided that the film is applied at a temperature below a melting point of the second polymer mass.

Preferably, it can be provided that the method further comprises the step f) structuring of the top layer, wherein the top layer is preferably applied with a structured roller of an embossing calender. In this way, it can be achieved that the top layer is provided with a particularly pleasant haptic, resulting in a particularly valuable impression.

Preferably, it can be provided that the structuring is carried out after the calibration in method step d), wherein the structuring is preferably carried out immediately after the calibration. In this way, it can be achieved that essentially no special temperature control is necessary. In particular, it can be achieved in this way that the plate-shaped carrier, or the top layer, does not have to be reheated.

Preferably, it can be provided that the structuring provides the top layer with an all-over structure. It could be shown that this type of structure is particularly suitable for the method described above, since it does not require any special matching of the decoration and the structure.

Preferably, it may be provided that the structuring is carried out at a temperature lower than the temperature of the sealable layer of the plate-shaped carrier when the film is applied. Preferably, it can be provided that the structuring takes place at a temperature in a range from greater than or equal to 60° C. to less than or equal to 140° C., preferably greater than or equal to 80° C. to less than or equal to 120° C., particularly preferably from greater than or equal to 90° C. to less than or equal to 110° C.

In a further step, the carrier plate provided with a decoration can then be divided into individual panels by suitable mechanical processes. This can be done, for example, by cutting the extruded strand according to regular intervals or regular times. Preferably, cut panels of equal length can be produced by this method step.

Further according to the disclosure a device for producing a decorated wall or floor panel is provided, wherein the device comprises means for carrying out the method according to the disclosure.

For the advantages of the device according to the disclosure, explicit reference is made to the advantages of the method according to the disclosure. A preferred embodiment for the device may comprise a temperature-controllable screw extruder for providing each of the molten polymer masses.

Preferably, it may be provided that the device comprises a feedblock and or a multi-channel die, in particular a feedblock. Further preferably, it may be provided that the device comprises a wide slot die with variable profile.

Furthermore, the device can comprise temperature-controllable and, in particular, coolable rollers. The individual rollers can be moved relative to one another in their positions in the production process, and consequently the roller gaps formed between the rollers can also be changed in their dimensions. Preferably, at least one larger main roller pair and several, preferably at least 3, further preferably 4, further preferably 5, smaller calibration rollers can be used for forming and calibrating the substrate. The temperatures of the rollers may respectively be adjustable separately.

The device may also comprise further means for final cooling of the carrier. It is also possible that the device also comprises further means for returning the heat dissipated by the carrier back into the product cycle. This can be done, for example, via heat exchangers. The recovered waste heat can be used, for example, for temperature control of the extruder. In addition, the device may comprise further means for mechanical processing of the carrier, for example for special profiling of the carrier edges. Furthermore, the device may comprise further means for subdividing the extruded plate into smaller panels of substantially equal length. This subdividing or cutting may be done, for example, by a saw. Circular or band saws may be suitable for this purpose, for example. However, it is also possible that the extruded plate provided with a decoration is subdivided into smaller panels by other physical means, such as a laser.

Further, according to the disclosure a plate-shaped carrier for a decorated wall or floor panel, produced according to the method according to the disclosure, comprising at least one carrier layer comprising the first polymer mass and a sealable layer contacting the carrier layer and comprising the second polymer mass is provided.

For the advantages of the plate-shaped carrier according to the disclosure, explicit reference is made to the advantages of the method according to the disclosure and to the advantages of the device according to the disclosure.

In particular, it should be noted that plate-shaped carriers can be obtained with very high line speeds via the method according to the disclosure, which carriers are characterized by particularly smooth surfaces and a low air content in and in the form of pores on the surface of the carriers. The number and size of surface defects caused by air can be significantly reduced. The temperature control and mechanical treatment also result in very low stress carriers. The method and the device are also suitable for processing a wide variety of materials.

Further, according to the disclosure a wall or floor panel produced by the method according to the disclosure is provided.

For the advantages of the wall and floor panels according to the disclosure, explicit reference is made to the advantages of the method according to the disclosure and to the advantages of the device according to the disclosure.

In particular, it should be noted that panels can be obtained with very high line speeds via the method according to the disclosure, which panels are characterized by particularly smooth surfaces and a low air content in and in the form of pores on the surface of the panels. The number and size of surface defects caused by air can be significantly reduced. The temperature control and the mechanical treatment also result in very low stress carriers. The method and the device are also suitable for processing a wide range of materials.

With regard to further technical features and advantages of the wall or floor panel, explicit reference is hereby made to the description of the method, the device, and the figures.

DRAWINGS

The disclosure is further explained below with reference to the figures and an exemplary embodiment.

Figure 2:
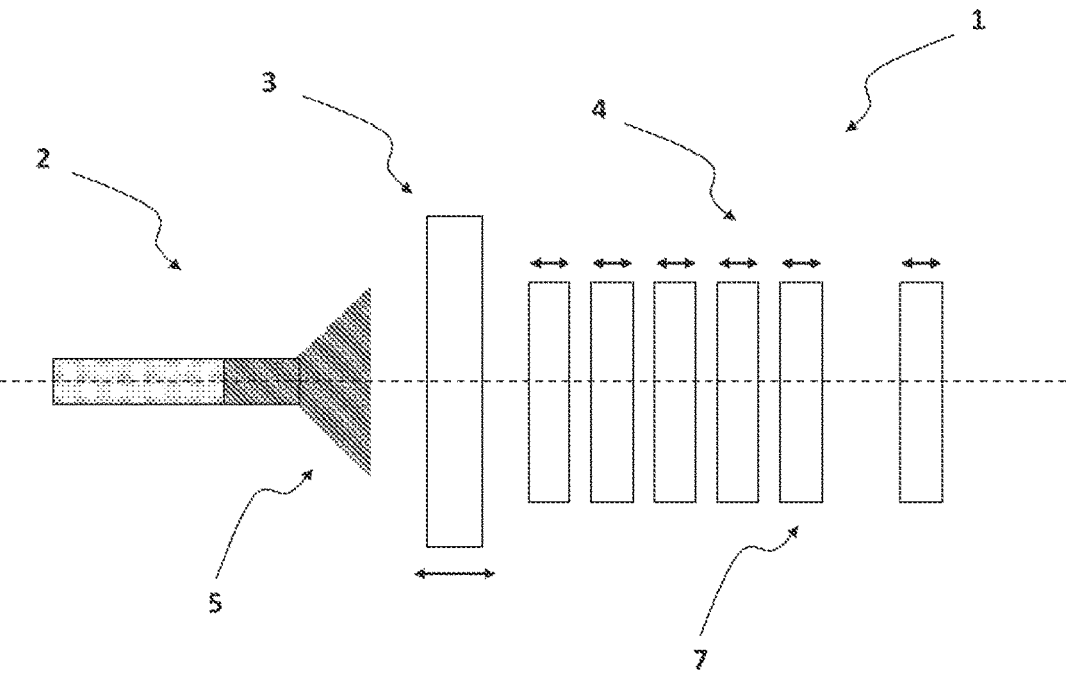
Figure 3:
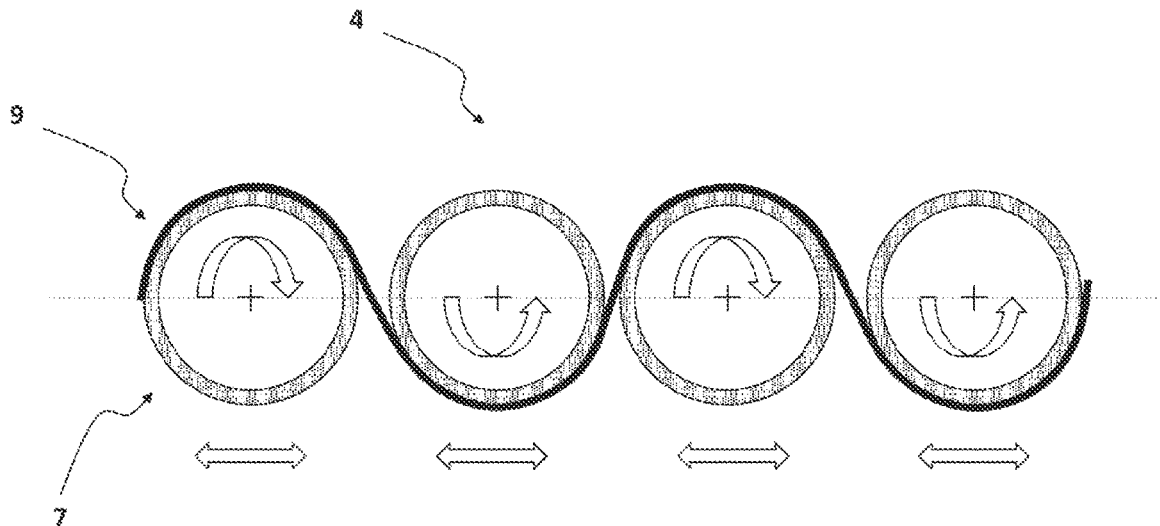
Figure 4:
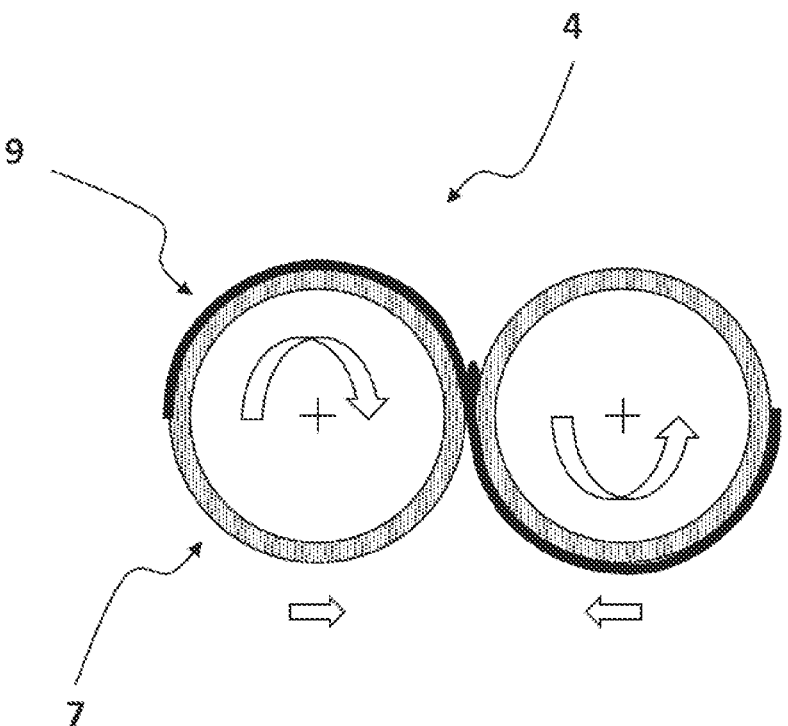
Figure 5:
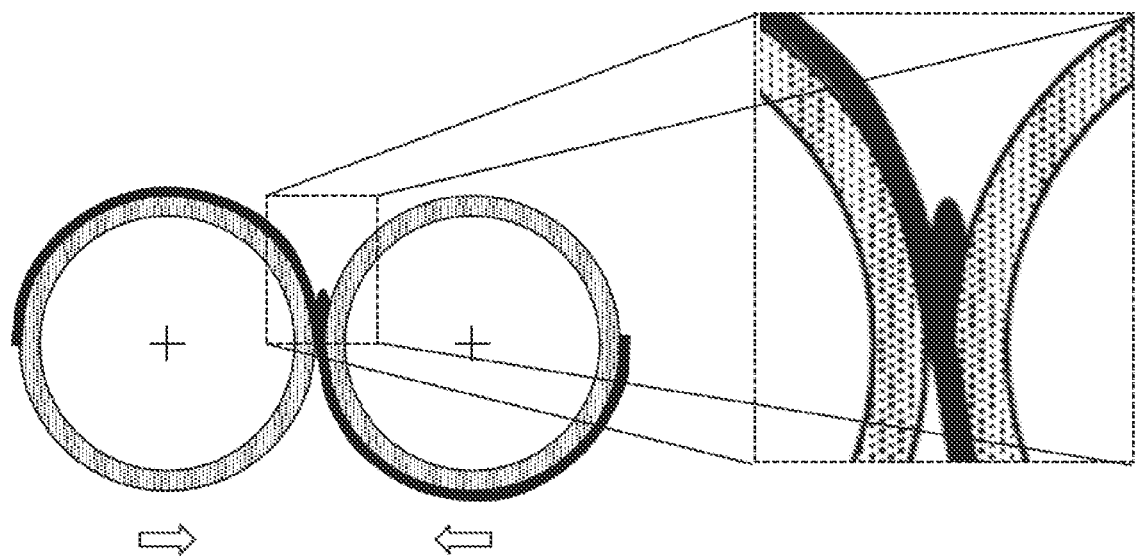
Figure 6:
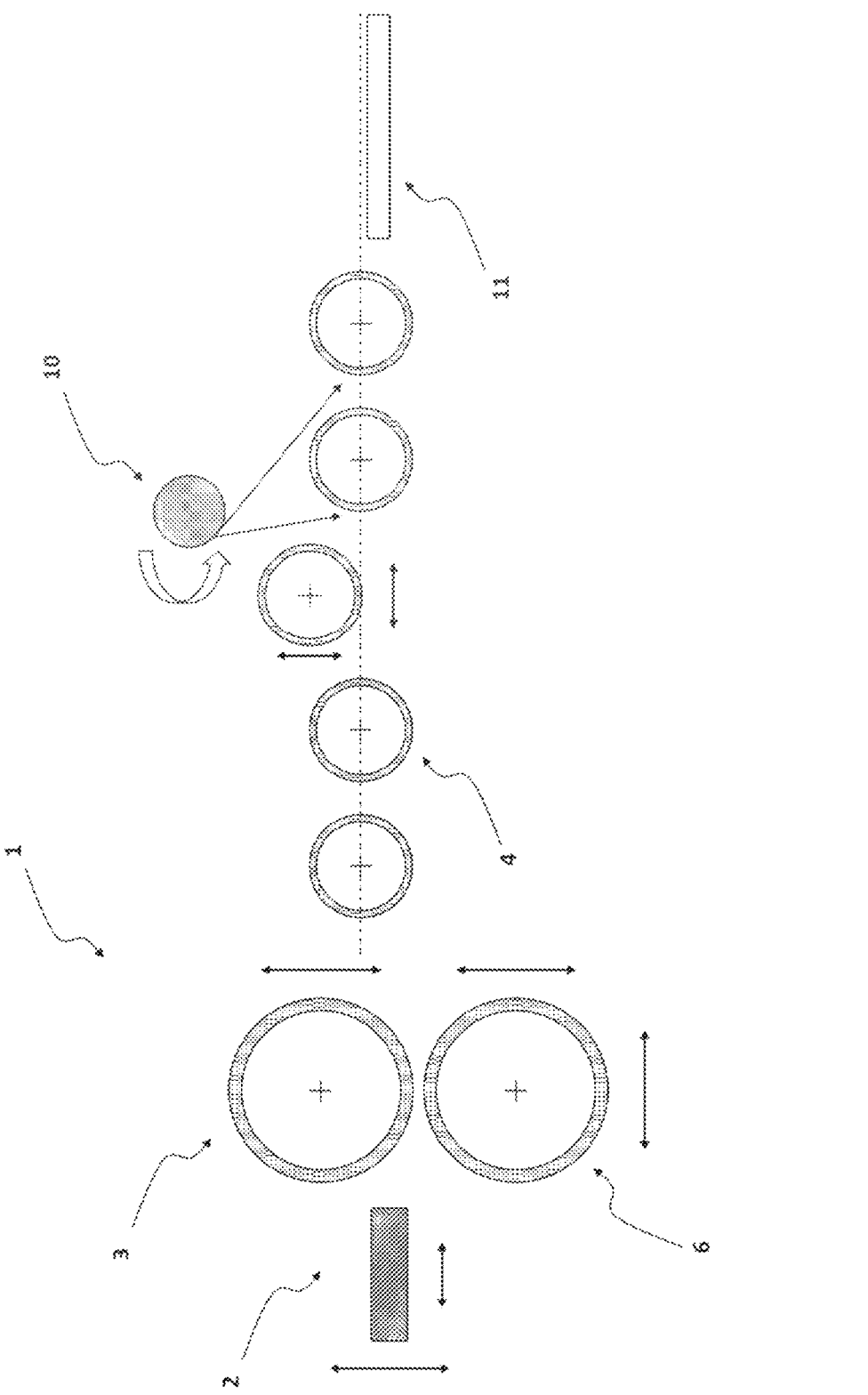

FIG. 1 shows a schematic cross-sectional view of a device configuration for carrying out the method according to the disclosure;

FIG. 2 schematically shows a top view of a device configuration for carrying out the method according to the disclosure;

FIG. 3 schematically shows the guiding of molten polymer material through a calibration roller arrangement;

FIG. 4 schematically shows the guiding of molten polymer material through a calibration roller arrangement;

FIG. 5 schematically shows the guiding of molten polymer material through a calibration roll arrangement with an enlarged section; and FIG. 6 schematically shows a cross-sectional view of one way of carrying out the method according to the disclosure.

DETAILED DESCRIPTION

The device 1 according to FIG. 1 is suitable for a process for producing a decorated wall or floor panel. FIG. 1 shows in cross-section the possible structure of the device for producing decorated panels 1, wherein in this figure in particular the assemblies extrusion device 2 with die 5, main roller pair 3 and calibration roller arrangement 4 are shown. In this embodiment, 6 calibration rollers 7 are shown, each of which can be controlled independently in their X, and Y positions. A possible rotation direction sequence for the individual calibration rollers 7 is indicated by the arrows. The device 1 schematically shows the extrusion device 2, which for each molten polymer mass is divided into an extruder (not shown separately) for thermal treatment of polymer granules and the actual die 5, wherein the die is a multi-channel die or optionally a feed block is arranged between the extruders and the die or the multi-channel die (not shown) by which the molten polymer masses are layered on top of each other. The molten polymer strand exiting the die can be passed through the roller gap of the main roller arrangement 3 comprising the individual main rollers 6. The height of the roller gap between the two main rollers 6 can be variably adjusted by moving the main rollers 6 relative to each other. After the molten polymer masses layered on top of each other have undergone an initial shaping and, if necessary, cooling by the main roller gap, the strand is transferred to the calibration roller arrangement 4. In the calibration roller arrangement 4, the molten polymer strand is further reduced in height or calibrated. The strand is guided through the gaps between the individual calibration rollers 7 and its height is changed as a function of the gap distance. The individual calibration rollers 7 do not always have to be disposed the same distance apart, so that different gap heights can be set between the calibration rollers 7 during the process. The calibration rollers 7 also do not have to have the same height, but can also be arranged offset to each other. This can change the mechanical stretch properties of the molten polymer strand. After calibration by the main roller arrangement 3 and the individual calibration rollers 7, the calibrated and smoothed material can be provided with a decoration via a printing unit (not shown). Furthermore, the decorated surface of the panel can be provided with one or, if necessary, further layers, such as protective layers.

FIG. 2 shows a top view of a device 1 according to the disclosure. The extrusion device 2 is shown, comprising an extruder and a die, which transfers a molten polymer strand of polymer masses layered on top of each other to the main roller arrangement 3. The distance between the main roller arrangement 3 and the extrusion device 2 is variable and can be varied, for example via controlled electric motors. After the molten polymer mass has passed through the gap of the main roller arrangement 3, the carrier, which has been reduced in height and optionally been cooled already somewhat by the main roll arrangement 3, is guided into the calibrating roller arrangement 4. The calibration roller arrangement 4 consists of the individual calibration rollers 7, which form respective gaps between them through which the initially calibrated carrier is guided and further formed. The individual calibration rollers 7 can be moved as a whole or each separately in their relative position to one another. Furthermore, it is possible that the individual calibration rollers 7 are controlled in their roller surface temperature as a whole or separately.

FIG. 3 shows a possible guidance of the molten polymeric carrier 9 through the calibration roller gaps. By resting on the calibration rollers 7, the molten polymeric carrier 9 can be cooled, for example. In this arrangement of the individual calibration rollers 7, the thickness of the molten polymeric carrier 9 is rather changed by the mechanical tension of the rollers. The individual calibration rollers 7 are too far apart for the molten polymeric carrier 9 to experience a direct squeezing or compression through the gap between the calibration rollers 7.

FIG. 4 shows a similar calibration roller arrangement 4 comprising two calibration rollers 7 as in FIG. 3, wherein the calibration rollers 7 are closer together and form a gap which is smaller than the thickness of the molten polymeric carrier 9. Due to the fact that the molten polymeric carrier 9 is at least partially thicker than the calibration gap, the height of the molten polymeric carrier 9 is levelled out by the calibration gap between the calibration rollers 7.

FIG. 5 shows again the calibration roller section of FIG. 4 with an enlarged section. In the enlarged section, it can be seen that excess material of the molten polymeric carrier 9 is pushed up at the beginning of the calibration gap. As a result, the height of the molten polymeric carrier 9 is adjusted to the height of the calibration gap. The height of the calibration gap and thus the carrier height can be adjusted by the spacing of the calibration rollers 7. According to the disclosure, it is advantageous that the calibration rollers 7 are disposed so close together that as little ambient air as possible can get between the calibration rollers 7 and the molten polymeric carrier 9. The narrow pass through the gap ensures that as little additional air as possible is forced into the carrier surface. The latter can contribute to an improved calibrated carrier surface.

FIG. 6 shows a further embodiment of a device 1 for producing decorated panels according to the disclosure. The device 1 also comprises an extrusion device 2, for example with a wide slot die and an extruder. The molten polymeric mass is extruded through the die and passes via the gap of the main rollers 3 to the calibration roller arrangement 4 comprising the individual calibration rollers 7. In this figure, it is shown that the individual calibration rollers 7 do not necessarily have to be at the same height relative to one another. By deflecting a calibration roll 7 in height, for example, the mechanical forces and also the cooling properties can be changed over an air gap. Furthermore, the figure shows that within the calibration roller arrangement 4 comprising the different calibration rollers 7, a film 10 can be applied onto at least a partial area of the sealable layer of the plate-shaped carrier, which foil 10 is present, for example, as a rolled product and can be introduced at various locations of the calibration roller arrangement 4. By applying the film 10 within the calibration roller arrangement 4, an additional mechanical treatment of the layer can be carried out by the calibration rollers 7, which can lead to a better adhesion of the film to the carrier. Furthermore, it can be ensured in this way that the application of the film 10 does not cause the height of the carrier to deviate from the desired dimensions, since both the carrier and the film 10 pass through the final calibration gap. After application of the film 10, the carrier can be either further tempered/cooled in a defined manner or mechanically post-processed via further means 11. Suitable further means 11 for this purpose may be cooling or tempering surfaces or mechanical mills for further profiling, for example of the carrier edges.

The invention claimed is:

1. A method for producing a decorated wall or floor panel, comprising the steps of:
   a) providing a first molten polymer mass and a second molten polymer mass;
   b) extruding the first and the second molten polymer masses, wherein each polymer mass is extruded by a separate extruder, wherein the molten polymer masses are layered on top of each other,
   c) expelling the layered molten polymer masses through a die; and
   d) calibrating the layered molten polymer masses in order to form a plate-shaped carrier comprising at least one carrier layer comprising the first polymer mass and a sealable layer contacting the carrier layer and comprising the second polymer mass, wherein the method further comprises the method step:
   e) applying a film onto at least a partial area of the sealable layer of the plate-shaped carrier, wherein the film comprises at least one top layer, wherein the top layer comprises an inner side, an outer side and a decorative layer applied to the inner side of the top layer, and wherein the film is applied to the sealable layer in such a way that the outer side of the top layer faces away from the plate-shaped carrier, wherein said top layer comprises a fourth polymer, wherein said fourth polymer is a vinyl polymer or consists essentially thereof, wherein said fourth vinyl polymer is a homopolymer or a copolymer, and wherein the fourth vinyl polymer comprises a polypropylene-based vinyl polymer, or a polypropylene copolymer, or a polypropylene copolymer selected from the group consisting of a propylene-ethylene random copolymer, a propylene-ethylene block copolymer, and a polypropylene-ethylene-butylene copolymer.

2. The method according to claim 1, wherein the first polymer mass comprises a solid material, wherein the solid material comprises a layered silicate powder.

3. The method according to claim 1, wherein the second polymer mass comprises a third polymer, wherein the third polymer is a vinyl copolymer, wherein the third vinyl copolymer comprises a vinyl terpolymer, or a polypropylene-based vinyl copolymer, or a polypropylene-ethylene-butylene copolymer.

4. The method according to claim 1, wherein in step a) a third molten polymer mass is additionally provided and the plate-shaped carrier formed in step d) additionally comprises at least one backing layer contacting the carrier layer and comprising the third polymer mass.

5. The method according to claim 1, wherein the first and the second molten polymer masses are extruded in such a way that the carrier layer has a layer thickness of greater than or equal to 60% to less than or equal to 95% of the thickness of the plate-shaped carrier.

6. The method according to claim 1, wherein the calibration is carried out by means of an arrangement of a plurality of rotatable rollers, wherein the individual rollers are arranged one above the other or one behind the other and each roller of the plurality of rotatable rollers forms at least one calibration gap with adjacent rollers, said calibration gap having a calibration gap height defining the size of the gap, wherein the adjacent rollers form a pair of rollers through which the first and the second molten polymer masses layered one on top of the other are guided, wherein the calibration gap height can be variably adjusted by means of a horizontal and/or vertical movement of individual rollers during the production process.

7. The method according to claim 6, wherein the first and the second molten polymer masses layered on top of each other are guided through a plurality of pairs of rollers.

8. The method according to claim 1, wherein the film comprises a laminating layer, wherein the laminating layer is applied onto the decorative layer applied to the inner side of the top layer, wherein the laminating layer is bonded to the decorative layer via a laminating adhesive.

9. The method according to claim 1, wherein the method further comprises the step f) structuring the top layer, wherein the top layer is formed by a structured roller of an embossing calender.

10. A method for producing a decorated wall or floor panel, comprising the steps of:
   a) providing a first molten polymer mass and a second molten polymer mass;
   b) extruding the first and the second molten polymer masses, wherein each polymer mass is extruded by a separate extruder, wherein the molten polymer masses are layered on top of each other,
   c) expelling the layered molten polymer masses through a die;
   d) calibrating the layered molten polymer masses in order to form a plate-shaped carrier comprising at least one carrier layer comprising the first polymer mass and a sealable layer contacting the carrier layer and comprising the second polymer mass; and
   e) applying a film onto at least a partial area of the sealable layer of the plate-shaped carrier, wherein the film is applied during the calibration in method step d), wherein the film is applied downstream a first pair of rollers, and upstream a sixth calibration roller or upstream a fifth calibration roller or upstream a fourth calibration roller or upstream a third calibration roller.

* * * * *